US008264369B2

(12) United States Patent
Hall et al.

(10) Patent No.: US 8,264,369 B2
(45) Date of Patent: Sep. 11, 2012

(54) INTELLIGENT ELECTRICAL POWER DISTRIBUTION SYSTEM

(75) Inventors: David R. Hall, Provo, UT (US); Craig Boswell, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 683 days.

(21) Appl. No.: 12/393,796

(22) Filed: Feb. 26, 2009

(65) Prior Publication Data
US 2009/0151932 A1 Jun. 18, 2009

Related U.S. Application Data

(63) Continuation-in-part of application No. 11/860,761, filed on Sep. 25, 2007, which is a continuation-in-part of application No. 11/739,344, filed on Apr. 24, 2007, now Pat. No. 7,504,963, which is a continuation-in-part of application No. 11/421,387, filed on May 31, 2006, now Pat. No. 7,535,377, which is a continuation-in-part of application No. 11/421,357, filed on May 31, 2006, now Pat. No. 7,382,273, which is a continuation-in-part of application No. 11/133,905, filed on May 21, 2005, now Pat. No. 7,277,026.

(51) Int. Cl.
*G01V 3/00* (2006.01)
(52) U.S. Cl. ............... 340/854.8; 340/855.1; 340/855.9
(58) Field of Classification Search ............... 340/854.8, 340/855.1, 855.9
See application file for complete search history.

(56) References Cited

U.S. PATENT DOCUMENTS

| | | | |
|---|---|---|---|
| 1,971,315 A | 8/1934 | Lear | |
| 2,000,716 A | 5/1935 | Polk | |
| 2,064,771 A | 12/1936 | Vogt | |
| 2,301,783 A | 11/1942 | Lee | |
| 2,331,101 A | 10/1943 | Beard | |
| 2,414,719 A | 1/1947 | Cloud | |
| 2,748,358 A * | 5/1956 | Johnston | 439/194 |
| 3,090,031 A | 5/1963 | Lord | |
| 3,170,137 A | 2/1965 | Brandt | |
| 3,253,245 A | 5/1966 | Brandt | |
| 3,742,444 A * | 6/1973 | Lindsey | 340/853.3 |
| 3,876,972 A | 4/1975 | Garrett et al. | |
| 3,967,201 A | 6/1976 | Rorden | |
| 3,980,881 A | 9/1976 | Veach et al. | |
| 4,012,092 A | 3/1977 | Godbey | |
| 4,039,237 A | 8/1977 | Cullen et al. | |
| 4,042,874 A * | 8/1977 | Quinn et al. | 363/97 |
| 4,095,865 A * | 6/1978 | Denison et al. | 439/191 |

(Continued)

OTHER PUBLICATIONS

Emmerich, Claude L., "Steady-State Internal Temperature Rise in Magnet Coil Windings," 21 *Journal of Applied Physics* 75-80 (Feb. 1950).

(Continued)

*Primary Examiner* — Jennifer H Gay
*Assistant Examiner* — Tamatane Aga
(74) *Attorney, Agent, or Firm* — Brinks Hofer Gilson & Lione

(57) ABSTRACT

A downhole tool assembly with electrical connectors disposed proximate an upper end and a lower end of the tool intelligently distributes electrical power. Switches are disposed between the electrical connectors and selectively allow or disallow electrical continuity between the electrical connectors. A microprocessor is in electrical communication with the electrical connectors and the switches. The microprocessor causes the switches to open or close based on the present of a current at the electrical connectors.

16 Claims, 7 Drawing Sheets

U.S. PATENT DOCUMENTS

| | | | |
|---|---|---|---|
| 4,176,894 A | 12/1979 | Godbey | |
| 4,416,494 A | 11/1983 | Watkins et al. | |
| 4,578,675 A | 3/1986 | MacLeod | |
| 4,591,226 A | 5/1986 | Hargett et al. | |
| 4,660,910 A | 4/1988 | Sharp et al. | |
| 4,785,247 A | 11/1988 | Meador et al. | |
| 4,788,544 A | 11/1988 | Howard | |
| 4,806,928 A * | 2/1989 | Veneruso | 340/853.3 |
| 4,884,071 A | 11/1989 | Howard | |
| 4,901,069 A * | 2/1990 | Veneruso | 340/854.8 |
| 4,953,136 A * | 8/1990 | Kamata et al. | 367/25 |
| 5,008,664 A | 4/1991 | More et al. | |
| 5,223,826 A | 6/1993 | Amou et al. | |
| 5,336,997 A | 8/1994 | Anim-Appiah et al. | |
| 5,337,002 A | 8/1994 | Mercer | |
| 5,385,476 A | 1/1995 | Jasper | |
| 5,744,877 A | 4/1998 | Owens | |
| 5,928,546 A * | 7/1999 | Kramer et al. | 219/497 |
| 6,123,561 A | 9/2000 | Turner et al. | |
| 6,223,826 B1 | 5/2001 | Chau et al. | |
| 6,367,564 B1 | 4/2002 | Mills et al. | |
| 6,387,584 B1 | 5/2002 | Ikeda | |
| 6,392,317 B1 * | 5/2002 | Hall et al. | 307/90 |
| 6,402,524 B2 | 6/2002 | Wurm et al. | |
| 6,446,728 B2 | 9/2002 | Chau et al. | |
| 6,651,755 B1 | 11/2003 | Kelpe | |
| 6,655,464 B2 | 12/2003 | Chau et al. | |
| 6,670,880 B1 | 12/2003 | Hall et al. | |
| 6,684,952 B2 * | 2/2004 | Brockman et al. | 166/250.03 |
| 6,688,396 B2 | 2/2004 | Floerke et al. | |
| 6,717,501 B2 | 4/2004 | Hall et al. | |
| 6,727,827 B1 | 4/2004 | Edwards et al. | |
| 6,739,413 B2 | 5/2004 | Sharp et al. | |
| 6,799,632 B2 | 10/2004 | Hall et al. | |
| 6,821,147 B1 | 11/2004 | Hall et al. | |
| 6,830,467 B2 | 12/2004 | Hall et al. | |
| 6,831,571 B2 | 12/2004 | Bartel | |
| 6,844,498 B2 | 1/2005 | Hall et al. | |
| 6,845,822 B2 | 1/2005 | Chau | |
| 6,888,473 B1 | 5/2005 | Hall et al. | |
| 6,913,093 B2 | 7/2005 | Hall et al. | |
| 6,929,493 B2 | 8/2005 | Hall et al. | |
| 6,945,802 B2 | 9/2005 | Hall et al. | |
| 6,968,611 B2 | 11/2005 | Hall et al. | |
| 6,981,546 B2 | 1/2006 | Hall et al. | |
| 6,982,384 B2 | 1/2006 | Hall et al. | |
| 6,991,035 B2 | 1/2006 | Hall et al. | |
| 6,992,554 B2 | 1/2006 | Hall et al. | |
| 7,002,445 B2 | 2/2006 | Hall et al. | |
| 7,017,667 B2 | 3/2006 | Hall et al. | |
| 7,019,665 B2 | 3/2006 | Hall et al. | |
| 7,028,779 B2 | 4/2006 | Chau | |
| 7,040,003 B2 | 5/2006 | Hall et al. | |
| 7,041,908 B2 | 5/2006 | Hall et al. | |
| 7,053,788 B2 | 5/2006 | Hall et al. | |
| 7,064,676 B2 | 6/2006 | Hall et al. | |
| 7,069,999 B2 | 7/2006 | Hall et al. | |
| 7,080,998 B2 | 7/2006 | Hall et al. | |
| 7,091,810 B2 | 8/2006 | Hall et al. | |
| 7,098,767 B2 | 8/2006 | Hall et al. | |
| 7,098,802 B2 | 8/2006 | Hall et al. | |
| 7,123,160 B2 | 10/2006 | Hall et al. | |
| 7,139,218 B2 * | 11/2006 | Hall et al. | 367/82 |
| 7,142,129 B2 | 11/2006 | Hall et al. | |
| 7,150,329 B2 | 12/2006 | Chau | |
| 7,165,618 B2 * | 1/2007 | Brockman et al. | 166/313 |
| 7,168,510 B2 | 1/2007 | Boyle et al. | |
| 7,170,424 B2 * | 1/2007 | Vinegar et al. | 340/855.8 |
| 7,190,280 B2 | 3/2007 | Hall et al. | |
| 7,193,526 B2 | 3/2007 | Hall et al. | |
| 7,193,527 B2 | 3/2007 | Hall et al. | |
| 7,198,118 B2 | 4/2007 | Hall et al. | |
| 7,201,240 B2 | 4/2007 | Hall et al. | |
| 7,224,288 B2 | 5/2007 | Hall et al. | |
| 7,243,717 B2 | 7/2007 | Hall et al. | |
| 7,253,745 B2 | 8/2007 | Hall et al. | |
| 7,259,689 B2 * | 8/2007 | Hernandez-Marti et al. | 340/855.1 |
| 7,261,154 B2 | 8/2007 | Hall et al. | |
| 7,277,025 B2 | 10/2007 | Allan | |
| 7,277,026 B2 | 10/2007 | Hall et al. | |
| 7,298,286 B2 | 11/2007 | Hall | |
| 7,362,235 B1 | 4/2008 | Normann | |
| 7,382,273 B2 | 6/2008 | Hall et al. | |
| 7,453,768 B2 | 11/2008 | Hall et al. | |
| 7,482,945 B2 | 1/2009 | Hall | |
| 7,488,194 B2 | 2/2009 | Hall et al. | |
| 7,504,963 B2 | 3/2009 | Hall et al. | |
| 7,535,377 B2 | 5/2009 | Hall et al. | |
| 7,537,053 B1 | 5/2009 | Hall et al. | |
| 7,566,235 B2 | 7/2009 | Bottos et al. | |
| 7,572,134 B2 | 8/2009 | Hall et al. | |
| 7,586,934 B2 | 9/2009 | Hall et al. | |
| 7,649,475 B2 | 1/2010 | Hall et al. | |
| 7,817,062 B1 * | 10/2010 | Li et al. | 340/855.8 |
| 7,931,054 B2 * | 4/2011 | Pozgay et al. | 144/136.95 |
| 2001/0029780 A1 | 10/2001 | Bartel | |
| 2001/0040379 A1 | 11/2001 | Schultz et al. | |
| 2002/0050829 A1 * | 5/2002 | Xu | 324/654 |
| 2002/0135179 A1 * | 9/2002 | Boyle et al. | 285/21.1 |
| 2002/0193004 A1 * | 12/2002 | Boyle et al. | 439/577 |
| 2003/0094282 A1 * | 5/2003 | Goode et al. | 166/255.2 |
| 2004/0020644 A1 * | 2/2004 | Wilson et al. | 166/250.01 |
| 2004/0104797 A1 | 6/2004 | Hall et al. | |
| 2004/0108108 A1 * | 6/2004 | Bailey et al. | 166/242.6 |
| 2004/0113808 A1 | 6/2004 | Hall et al. | |
| 2004/0118608 A1 | 6/2004 | Haci et al. | |
| 2004/0140128 A1 * | 7/2004 | Vail, III | 175/57 |
| 2004/0145482 A1 | 7/2004 | Anderson | |
| 2004/0145492 A1 | 7/2004 | Hall et al. | |
| 2004/0150532 A1 | 8/2004 | Hall et al. | |
| 2004/0164636 A1 | 8/2004 | Okamoto et al. | |
| 2004/0164833 A1 | 8/2004 | Hall et al. | |
| 2004/0164838 A1 | 8/2004 | Hall et al. | |
| 2004/0202047 A1 | 10/2004 | Fripp et al. | |
| 2004/0216847 A1 | 11/2004 | Hall et al. | |
| 2004/0217880 A1 | 11/2004 | Clark et al. | |
| 2004/0244816 A1 | 12/2004 | Luo | |
| 2004/0244916 A1 | 12/2004 | Hall et al. | |
| 2004/0244964 A1 | 12/2004 | Hall et al. | |
| 2004/0246142 A1 | 12/2004 | Hall et al. | |
| 2005/0001730 A1 | 1/2005 | Alderman | |
| 2005/0001735 A1 | 1/2005 | Hall et al. | |
| 2005/0001736 A1 | 1/2005 | Hall et al. | |
| 2005/0001738 A1 | 1/2005 | Hall et al. | |
| 2005/0035874 A1 | 2/2005 | Hall et al. | |
| 2005/0035875 A1 | 2/2005 | Hall et al. | |
| 2005/0035876 A1 | 2/2005 | Hall et al. | |
| 2005/0036507 A1 | 2/2005 | Hall et al. | |
| 2005/0039912 A1 | 2/2005 | Hall et al. | |
| 2005/0045339 A1 | 3/2005 | Hall et al. | |
| 2005/0046586 A1 | 3/2005 | Hall et al. | |
| 2005/0046590 A1 | 3/2005 | Hall et al. | |
| 2005/0067159 A1 | 3/2005 | Hall et al. | |
| 2005/0070144 A1 | 3/2005 | Hall et al. | |
| 2005/0082082 A1 | 4/2005 | Walter et al. | |
| 2005/0082092 A1 | 4/2005 | Hall et al. | |
| 2005/0092499 A1 | 5/2005 | Hall et al. | |
| 2005/0093296 A1 | 5/2005 | Hall et al. | |
| 2005/0095827 A1 | 5/2005 | Hall et al. | |
| 2005/0115717 A1 | 6/2005 | Hall et al. | |
| 2005/0145406 A1 | 7/2005 | Hall et al. | |
| 2005/0150653 A1 | 7/2005 | Hall et al. | |
| 2005/0150853 A1 | 7/2005 | Kimball | |
| 2005/0161215 A1 | 7/2005 | Hall et al. | |
| 2005/0173128 A1 | 8/2005 | Hall et al. | |
| 2005/0190584 A1 * | 9/2005 | Hernandez-Marti et al. | 363/34 |
| 2005/0212530 A1 | 9/2005 | Hall et al. | |
| 2005/0236160 A1 | 10/2005 | Hall et al. | |
| 2005/0284662 A1 | 12/2005 | Hall et al. | |
| 2005/0285705 A1 | 12/2005 | Hall et al. | |
| 2006/0038699 A1 * | 2/2006 | Dodge et al. | 340/854.8 |
| 2006/0048586 A1 | 3/2006 | Sanada et al. | |
| 2006/0113803 A1 | 6/2006 | Hall et al. | |
| 2006/0124291 A1 | 6/2006 | Chau | |

| | | | | | |
|---|---|---|---|---|---|
| 2006/0126249 A1* | 6/2006 | Boling ............ 361/103 | 2008/0047703 A1 | 2/2008 | Stoesz et al. |
| 2006/0129339 A1* | 6/2006 | Bruno ............ 702/60 | 2009/0151926 A1 | 6/2009 | Hall et al. |
| 2006/0187084 A1* | 8/2006 | Hernandez-Marti et al. ............ 340/854.9 | 2009/0151932 A1* | 6/2009 | Hall et al. ............ 166/244.1 |
| 2006/0236160 A1 | 10/2006 | Ueda et al. | 2009/0212970 A1 | 8/2009 | Hall et al. |
| 2007/0017671 A1 | 1/2007 | Clark et al. | | | |
| 2007/0018848 A1 | 1/2007 | Bottos et al. | | | |
| 2007/0030167 A1 | 2/2007 | Li et al. | | | |
| 2007/0102197 A1 | 5/2007 | Rotthaeuser | | | |
| 2007/0137853 A1 | 6/2007 | Zhang et al. | | | |
| 2008/0041575 A1 | 2/2008 | Clark et al. | | | |

OTHER PUBLICATIONS

Hughes, Edward, "Determination of the Final Temperature-Rise of Electrical Machines from Heating Tests of Short Duration," 68(403) *Journal of the Institution of Electrical Engineers* 932-941 (Jul. 1930).

* cited by examiner

INTELLIGENT ELECTRICAL POWER DISTRIBUTION SYSTEM

CROSS REFERENCE TO RELATED APPLICATIONS

This application is a continuation-in-part of U.S. application Ser. No. 11/860,761 which is a continuation-in-part of U.S. application Ser. No. 11/739,344 filed on Apr. 24, 2007, entitled "System and Method for Providing Electrical Power Downhole" and which is now U.S. Pat. No. 7,504,963 issued on Mar. 17, 2009. U.S. application Ser. No. 11/739,344 is a continuation-in-part of U.S. application Ser. No. 11/421,387 filed on May 31, 2006, entitled, "Wired Tool String Component" and which is now U.S. Pat. No. 7,535,377 issued on May 19, 2009. U.S. application Ser. No. 11/421,387 is a continuation-in-part of U.S. application Ser. No. 11/421,357 filed on May 31, 2006, entitled, "Wired Tool String Component" and which is now U.S. Pat. No. 7,382,273 issued on Jun. 3, 2008. U.S. application Ser. No. 11/421,357 is a continuation-in-part of U.S. application Ser. No. 11/133,905 filed on May 21, 2005, entitled, "Downhole Component with Multiple Transmission Elements", and which is now U.S. Pat. No. 7,277,026 issued on Nov. 2, 2007. All of these applications are herein incorporated by reference for all that they contain.

BACKGROUND

This invention relates to supplying power to a tool in a downhole environment. Measuring while drilling (MWD) and logging while drilling (LWD) tools typically require electrical power to function; accordingly, it is desirable to provide sufficient power to ensure proper operation and accurate data collection.

Such efforts are disclosed in U.S. Pat. No. 5,744,877 to Owens, which is herein incorporated by reference for all that it contains. Owens discloses a system for providing large quantities of power at a selected voltage to a downhole well tool. A conductor extends between a surface regulator and the well tool. The voltage is continuously measured downhole at the well tool, and a signal proportional to such downhole voltage is transmitted to the surface regulator. The power transmitted by the surface regulator to the conductor is increased or decreased depending on fluctuations in the tool requirements and the downhole voltage. The downhole voltage signal can be modulated through the conductor to the surface regulator or can be transmitted through another conductor.

U.S. Pat. No. 3,980,881 to Veach et al., which is herein incorporated by reference for all that it contains, discloses an improved well logging system utilizing a single conductor cable to provide power from surface equipment to a down hole subsurface unit and for simultaneously supplying current mode telemetry signals from one or more radiation detectors in the subsurface unit to the surface equipment. The surface equipment includes a power supply for the subsurface unit comprising a constant current source having a high output impedance connected to a series pass voltage regulator having a low output impedance. A switching mode voltage regulator is employed within the subsurface unit to compensate for variations in the voltage supplied to the subsurface unit which result from variations in cable resistance and other factors.

U.S. Pat. No. 4,806,928 to Veneruso, which is herein incorporated by reference for all that it contains, describes a downhole tool adapted to be coupled in a pipe string and positioned in a well that is provided with one or more electrical devices cooperatively arranged to receive power from surface power sources or to transmit and/or receive control or data signals from surface equipment. Inner and outer coil assemblies arranged on ferrite cores are arranged on the downhole tool and a suspension cable for electromagnetically coupling the electrical devices to the surface equipment is provided.

BRIEF SUMMARY

In one aspect of the present invention, a downhole tool assembly comprises first and second electrical power connectors disposed in a first section and a second section of the downhole tool. Each electrical power connector is associated with at least one power source. An electrical tool instrument is disposed intermediate the connectors, and switches are intermediate the electrical connectors is selectively allow or disallow power to the electrical tool instrument. A microprocessor is in electrical communication with the electrical connectors and switches.

The electrical power connectors may comprise inductive coils disposed proximate the upper and lower ends of the downhole tool. The inductive coils may be magnetically shielded to prevent interference with the operation of the downhole tool assembly. The electrical power connectors may comprise conductive rings disposed proximate the upper and lower ends of the downhole tool. One or both of the electrical power connectors may be in communication with one or more electrical power sources. The power sources may supply alternating current power to the electrical power connectors.

Rectifiers may be disposed intermediate the electrical connectors and a power consuming circuit of the downhole tool. The rectifiers may be solid-state, full-wave rectifiers. One or more filtering devices may be disposed intermediate the rectifiers and the power consuming element of the downhole tool, and may comprise capacitors, inductors, or other filtering elements.

The power sources may comprise fluid driven turbines connected to electrical generators or may comprise batteries. Voltage regulators may be disposed intermediate the power sources and the power consuming circuit of the downhole tool.

The switches may comprise solid state components such as TRIACs, or may comprise electromechanical components such as relays.

The downhole tool may comprise resistivity transmitter coils and receiver coils, or may comprise a nuclear or seismic measurement device.

In another aspect of the present invention, a method for distributing power downhole comprises the steps of providing a downhole tool intermediate two adjacent downhole assemblies, electrically coupling the downhole tool to the adjacent downhole assemblies, supplying power to the downhole tool from one or both of the adjacent downhole assemblies, detecting the power supply or load from each adjacent downhole assembly, and switching the downhole tool to accept power from both adjacent downhole assemblies, or to accept power from one adjacent downhole assembly and transfer power to the other adjacent downhole assembly.

The switching may be initiated by the microprocessor and by the oscillations of an alternating current waveform, or the switching may be initiated by a direct current or voltage triggered device.

In another aspect of the present invention, a downhole tool assembly comprises first and second power sources intermediate an electrical tool instrument, with switches intermediate the electrical sources to selectively allow or disallow power to the electrical tool instrument, and a microprocessor in electrical communication with the switches and the first and second power sources.

DETAILED DESCRIPTION

Figure 1:
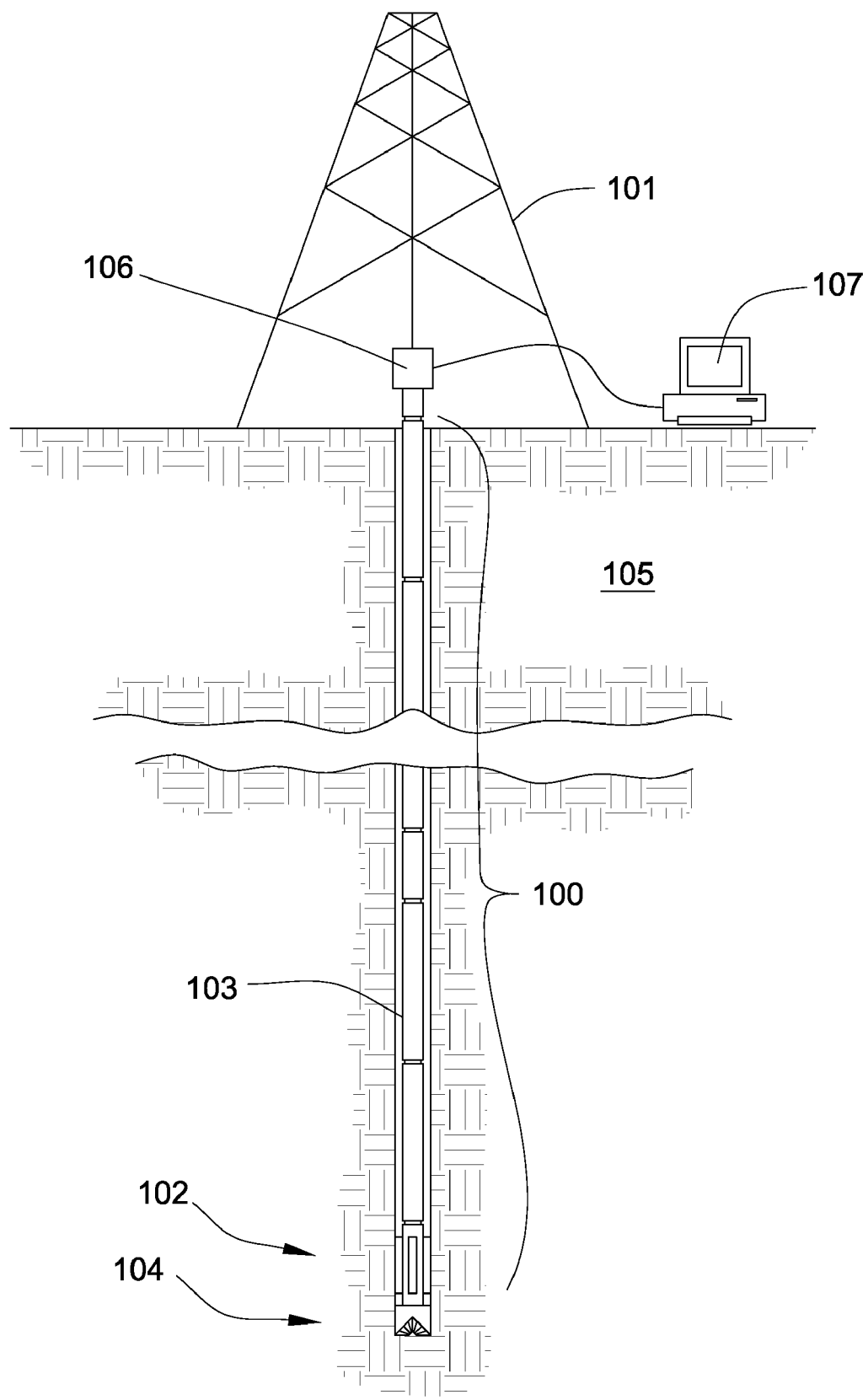
FIG. 1 is a cross-sectional view of an embodiment of a drilling assembly.

Referring now to the figures, FIG. 1 illustrates a drill string 100 comprising a drill bit 104 suspended in a borehole 103 by a drilling derrick 101. As the drill string 100 rotates, the drill bit 104 advances in the formation 105. A bottom hole assembly 102 may be disposed above the drill bit 104, and may comprise power generation equipment, measurement while drilling (MWD) tools, logging while drilling (LWD) tools, steering mechanisms, or combinations thereof. The MWD and LWD tools may aid in the locating of and retrieval of deposits contained in the formation. The data collected by the MWD and LWD tools may be sent through data transfer systems in the drill string 100 and a data swivel 106 to the surface for analysis by a computer 107 or other methods.

Figure 2:
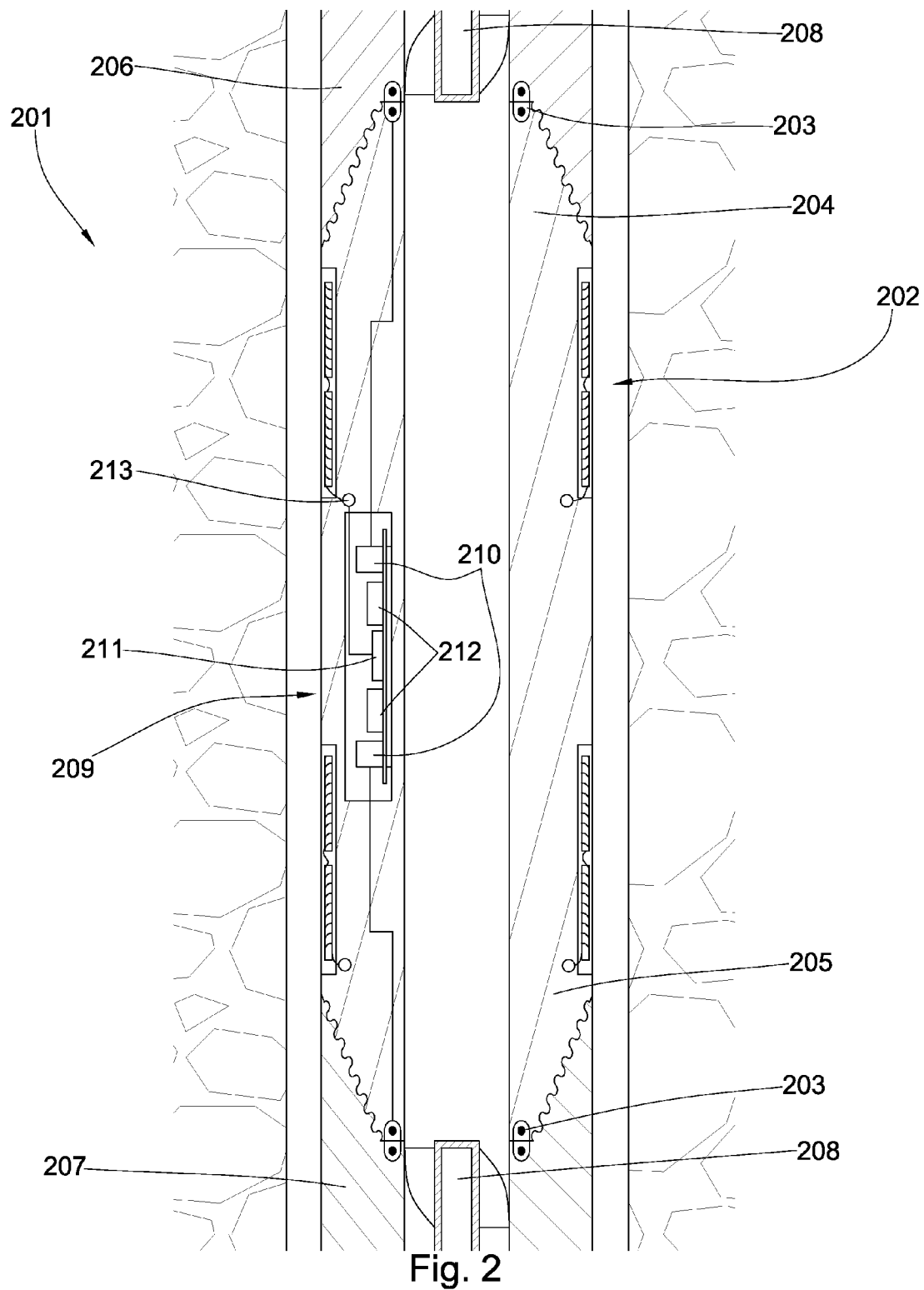
FIG. 2 is a cross-sectional view of an embodiment of a downhole tool assembly.

FIG. 2 discloses an embodiment of a downhole tool assembly 201 comprising an electrical tool instrument such as a resistivity tool. In this embodiment, a power consuming circuit of the electrical tool instrument may comprise a plurality of resistivity transmitter and receiver coils 202 disposed proximate the exterior of the downhole tool assembly 201. The downhole tool assembly 201 may be disposed intermediate, or between, two adjacent drill string components 206 and 207. Adjacent drill string components 206 and 207 may comprise fluid powered turbine generators 208 driven by a flow of drilling mud. The turbine generators 208 may produce alternating current electrical power. Electrical connectors 203 are disposed proximate an upper end 204 and a lower end 205 of the downhole tool assembly 201. In this embodiment, the electrical connectors 203 comprise inductive coils contained in a ferrite trough. It is believed that the ferrite trough prevents the strong electromagnetic fields generated by the inductive coils from interfering with the measurement tools. Corresponding inductive coils are similarly disposed in the adjacent drill string components 206 and 207 and may transfer alternating current electrical power to or from the adjacent drill string components 206 and 207. In some embodiments, the electrical power connectors 203 may also transfer electrical data signals in conjunction with the electrical power.

The electrical connectors 203 are in electrical communication with a control unit 209, which may comprise switches 210 and a microprocessor 211. In this embodiment, the turbine generators 208 may produce alternating current power, while the power consuming circuit of the electrical tool instrument may accept direct current electrical power. Accordingly, rectifiers 212 are disposed intermediate, or between, the switches 210 and a power consuming circuit of the electrical tool instrument. The rectifiers 212 may comprise solid state diodes, preferably in a full wave bridge rectifier arrangement. The electrical power may undergo conditioning before being supplied to the power consuming circuit. The power conditioning may comprise filter capacitors, inductors, and similar components to provide a more consistent and stable direct current voltage supply to the power consuming element of the downhole tool assembly 201. The switches 210, microprocessor 211, rectifiers 212, and filtering elements may be disposed on a single printed circuit board, and the circuit board may be disposed in a cavity in the wall of the downhole tool assembly 201.

Figure 3:
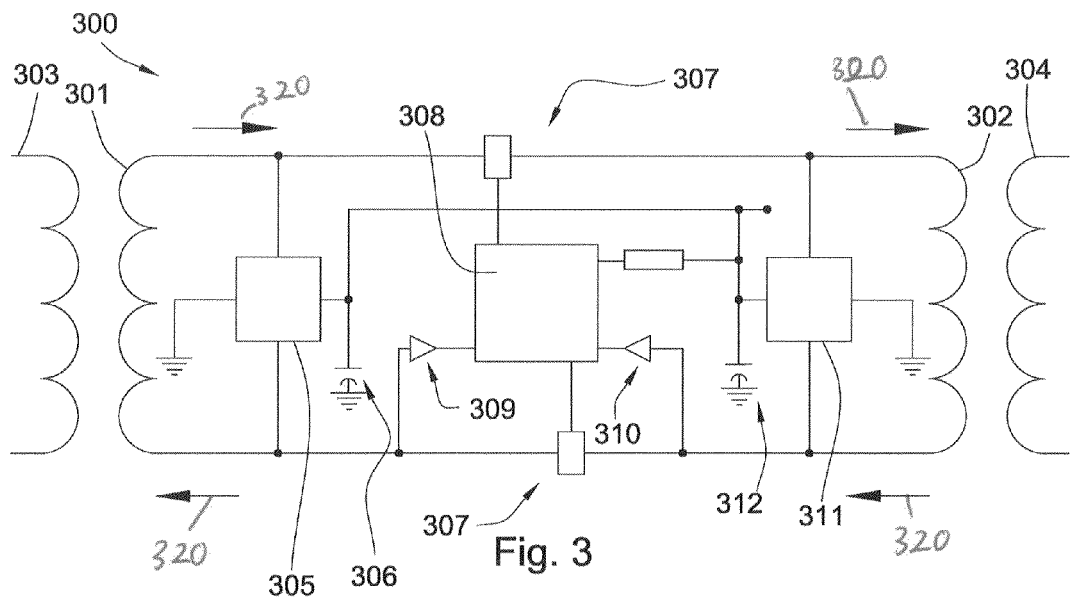
FIG. 3 is an electrical block diagram of an embodiment of a power distribution circuit illustrating a flow of current when the switches are closed.
Figure 4:
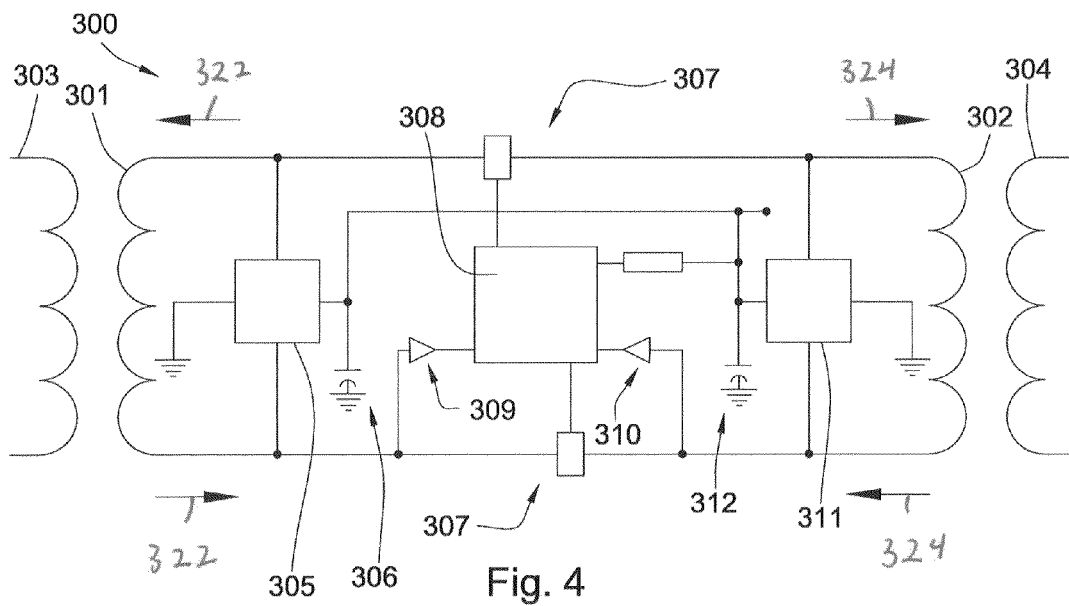
FIG. 4 is an electrical block diagram of the embodiment of a power distribution circuit of FIG. 3 illustrating a flow of current when the switches are closed.

FIG. 3 and FIG. 4 illustrate an electrical block diagram of an embodiment of a power distribution circuit 300. Electrical connectors comprising inductive coils 301 and 302 are in communication with corresponding inductive coils 303 and 304 disposed in adjacent drill string components. One or both of the inductive coils 303 or 304 disposed in the adjacent drill string components may be energized by a current source, thus inducing a magnetic field around the inductive coil 303 or 304. This magnetic field induces a current in the corresponding inductive coil 301 or 302, respectively.

In FIG. 3, coil 303 is energized by an electrical current flowing from a power source (not shown) and generates a magnetic field. The magnetic field induces a current in inductive coil 301, and electrical current flows through inductive coil 301 and inductive coil 302 as shown by arrows 320. Inductive coil 302 may generate a magnetic field thus inducing a current in inductive coil 304, thereby transmitting power to an adjacent drill string component. Adjacent inductive coils may have the same number of windings, or may have different numbers of windings and function as a step up or step down transformer to accommodate the voltage requirements of various drill string components or to allow power transfer over larger distances with less power loss. Rectifiers 305 and 311 and filter capacitors 306 and 312 convert alternating current power to direct current power suitable to power an electrical tool instrument.

In this embodiment, triodes for alternation current (TRIACs) 307 are disposed electrically intermediate the inductive coils 301 and 302. The TRIACs are controlled by a microprocessor 308, and the microprocessor 308 is connected to sensors 309 and 310 that detect current in inductive coils 301 and 302. Current flowing in inductive coil 301 triggers sensor 309, signaling the microprocessor to turn the TRIACs on by applying a voltage to the TRIAC gate. Current is thus allowed to flow through the TRIACs 307 from coil 301 to coil 302 until the current drops below a specified threshold, such as at the end of a half-cycle of alternating current power, at which time the TRIACs stop conducting electrical current. At the beginning of the next half-cycle, sensor 309 will signal the microprocessor 308 to again supply a trigger voltage to the TRIAC gates, and the cycle repeats. Alternatively, the microprocessor may supply a constant signal to the TRIAC gate. In this way, current is allowed to flow from coil 301 to coil 302 and current is induced in coil 304, transmitting electrical power to an adjacent drill string component. Microprocessor 308 may be powered by the direct current power supplied by the rectifiers 212.

FIG. 4 discloses the power distribution circuit 300 wherein coils 303 and 304 are both energized by alternating current power sources, and thus both generate magnetic fields. The magnetic fields generated by coils 303 and 304 induce currents in coil 301 and coil 302 as shown by arrows 322 and 324. The currents in coils 303 and 304 may be in phase with each other, or out of phase with any phase shift. In this example, both sensors 309 and 310 detect a current, and signal the microprocessor 308 to leave the TRIACs 307 off, and coils 301 and 302 remain electrically isolated from each other. Rectifiers 305 and 311 and filter capacitors 306 and 312 convert the alternating current power to direct current power, suitable for consumption by an electrical tool instrument. Sensors 309 and 310 may comprise diodes with voltage limiters.

By providing power sources in both tool string components adjacent to the electrical tool instrument as disclosed in FIG. 4, the maximum power available to the electrical tool instrument may be increased as compared to providing a single power source. Increased power may allow collection of a wider range of data with more accuracy from measurement and logging tools.

Figure 5:
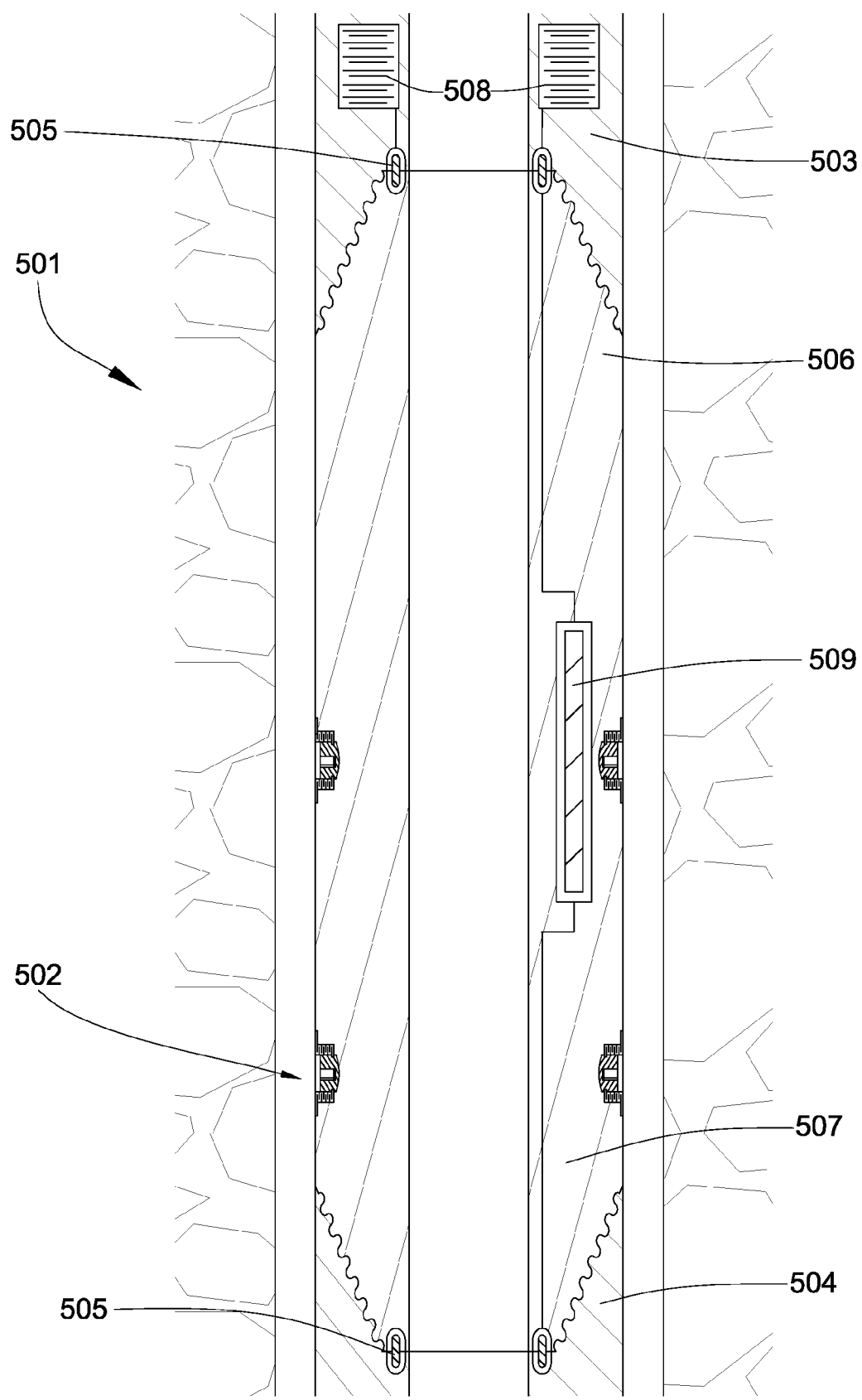
FIG. 5 is a cross-sectional view of an embodiment of a downhole tool assembly.

FIG. 5 discloses another embodiment of a downhole tool assembly 501. In this embodiment, a downhole tool assembly 501 comprises an electrical tool instrument 502 which may comprise nuclear or seismic imaging transmitters and/or receivers. The downhole tool assembly 501 is disposed intermediate adjacent drill string components 503 and 504. Electrical connectors 505 comprising conductive rings are disposed proximate an upper end 506 and a lower end 507 of the downhole tool assembly 501, and corresponding conductive rings are similarly disposed in the adjacent drill string components 503 and 504. In this embodiment, the conductive rings 505 come into mechanical contact and thus electrical continuity when the adjacent drill string components 503 and 504 are assembled to the downhole tool assembly 501. Batteries 508 may be disposed in one or both adjacent drill string components, and are in electrical communication with the electrical connectors 505. In this embodiment, batteries 508 supply direct current electrical power to an electrical tool instrument 502 disposed in the downhole tool assembly 501, as well as to the adjacent drill string component 504, which may comprise a power consuming circuit or may transmit power to another drill string component, or transmit power from another power source.

In the embodiment of FIG. 5, a control unit 509 is disposed within the downhole tool and comprises relays, power sensors, and a microprocessor. The relays may initially be open to disallow electrical continuity between the upper and lower electrical connectors 505. If a voltage is sensed at only one of the upper and lower electrical connectors 505, the microprocessor will signal the relay to close and allow electrical power to flow from one electrical connector 505 to the other electrical connector 505 and to an adjacent drill string component. If a voltage is present at both electrical power connectors 505, the relays will remain open.

Figure 6:
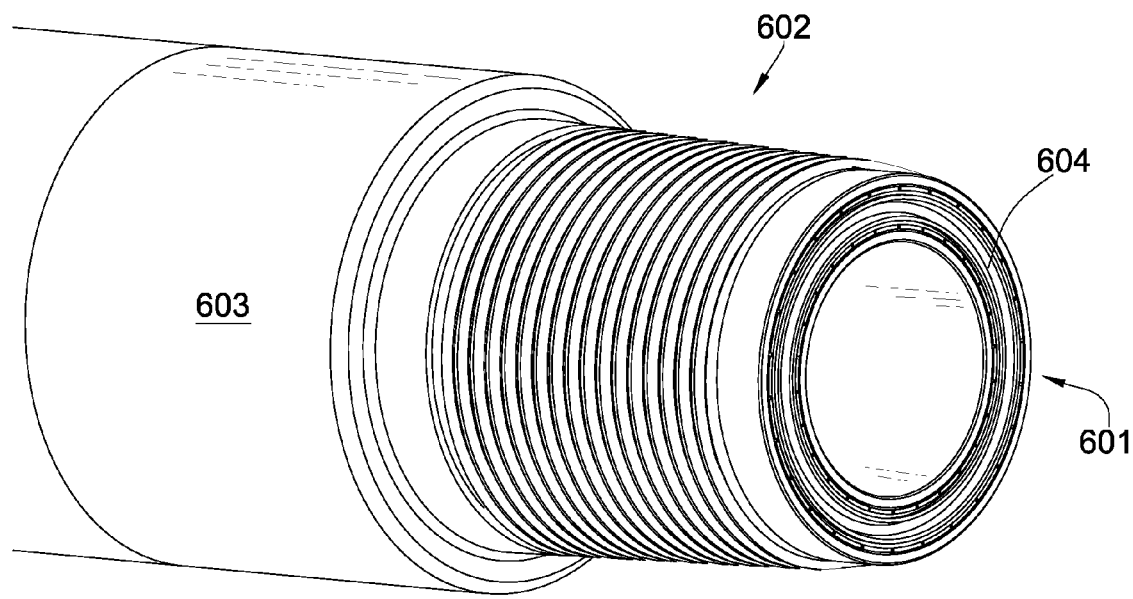
FIG. 6 is a perspective view of an embodiment of a downhole tool with an electrical connector.

FIG. 6 discloses an embodiment of an electrical power connector. In this embodiment, the electrical power connector 601 is disposed at an end 602 of a downhole tool assembly 603, and comprises at least one inductive coil 604. The electrical power connector may comprise a plurality of inductive coils adapted to transfer electrical power, data, or both. The magnetic fields generated by passing current through the inductive coils may interfere with the operation of the downhole tool assembly, particularly if the downhole tool relies on measuring the propagation of an electromagnetic wave through the formation. Thus, it may be necessary to magnetically shield the coil to prevent interference with the measuring or logging tool. Accordingly, the inductive coil 604 may be disposed in a magnetically conductive trough, the trough comprising materials such as ferrite, mu-metal, or ferromagnetic alloys including combinations of nickel, cobalt, iron, and other metallic elements.

Figure 7:
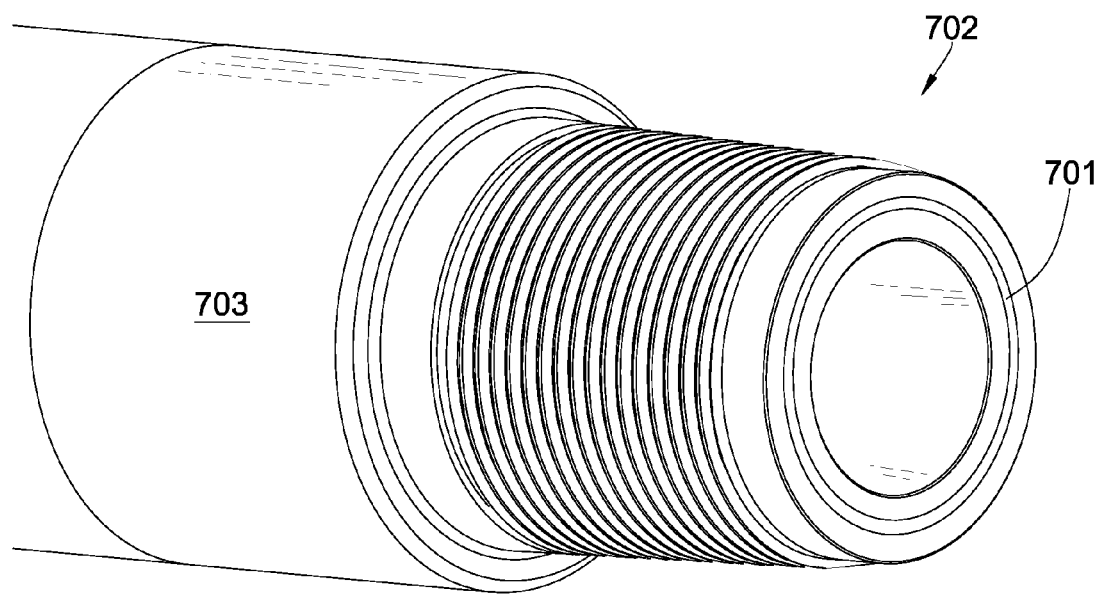
FIG. 7 is a perspective view of another embodiment of a downhole tool with an electrical connector.

FIG. 7 discloses another embodiment of an electrical power connector. In this embodiment, a conductive ring 701 is disposed on an end 702 of a downhole tool assembly 703. When the downhole tool assembly is assembled to another drill string component, the conductive ring in the downhole tool comes into contact with a corresponding conductive ring in the other drill string component, and electrical power is allowed to flow through the junction. The conductive rings may be constructed from metals or metal alloys, or any material with sufficient strength and electrical conductivity.

Figure 8:
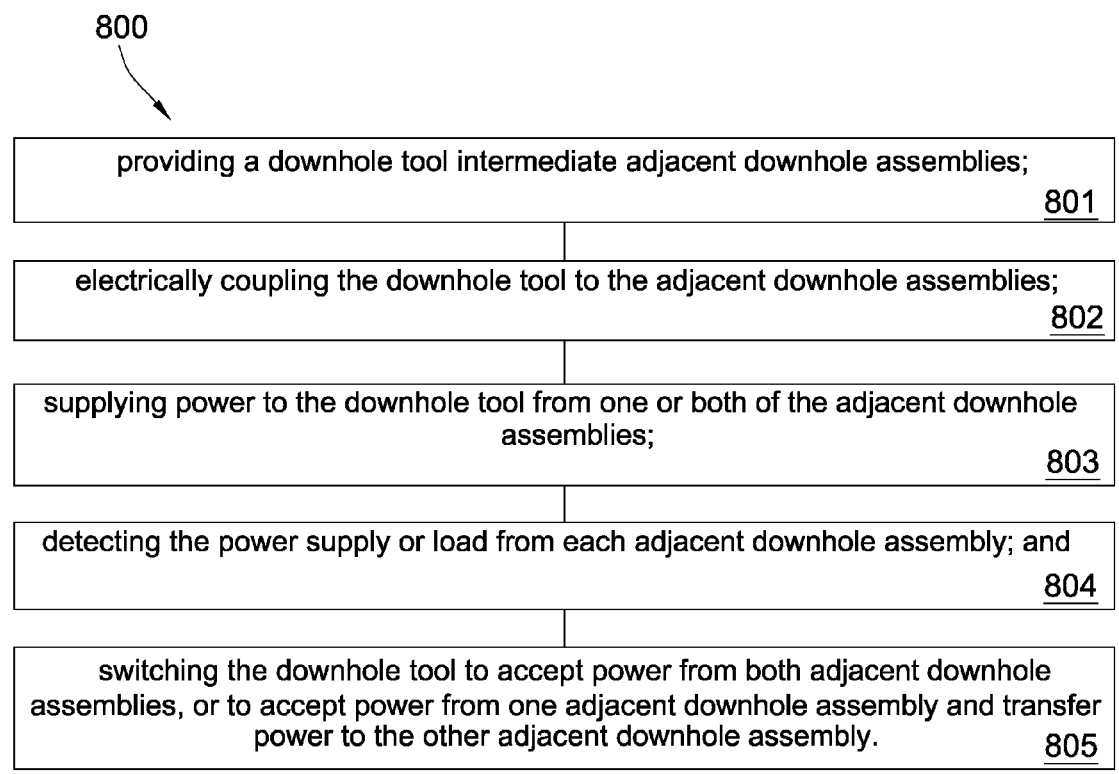
FIG. 8 is a flow chart of a method for downhole power distribution.

FIG. 8 discloses a method 800 for downhole power distribution comprising the steps of providing 801 a downhole tool intermediate adjacent downhole assemblies, electrically coupling 802 the downhole tool to the adjacent downhole assemblies, supplying 803 power to the downhole tool from one or both of the adjacent downhole assemblies, detecting 804 the power supply or load from each adjacent downhole assembly, and switching 805 the downhole tool to accept power from both adjacent downhole assemblies, or to accept power from one adjacent downhole assembly and transfer power to the other adjacent downhole assembly.

Figure 9:
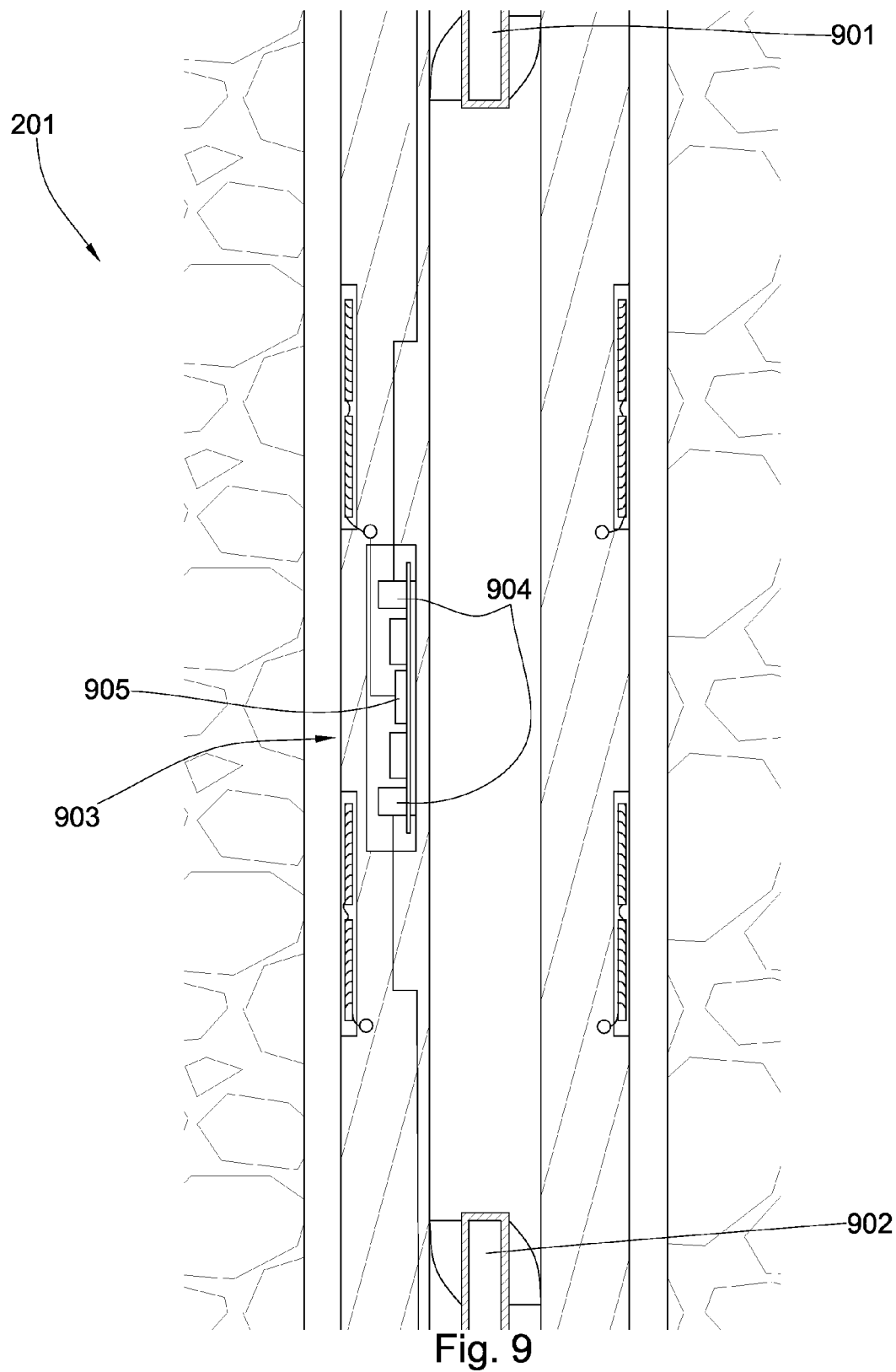
FIG. 9 is a cross-sectional view of another embodiment of a downhole tool assembly.

FIG. 9 discloses a downhole tool assembly 201 comprising an electric tool instrument such as a resistivity tool and power sources 901 and 902. Power sources 901 and 902 are connected to a control unit 903 comprising switches 904 that selectively allow or disallow power to the electrical tool instrument. A microprocessor 905 is in communication with the power sources 901 and 902 and the switches 904.

Whereas the present invention has been described in particular relation to the drawings attached hereto, it should be understood that other and further modifications apart from those shown or suggested herein, may be made within the scope and spirit of the present invention.

What is claimed is:
1. A downhole tool assembly, comprising;
a tubular body having a first end and a second end;
a first electrical connector disposed in the first end of said tubular body;
a second electrical connector disposed in the second end of said tubular body;
an electrical tool instrument disposed between the connectors;
a first switch disposed between said first electrical connector and said second electrical connector, said first switch configured to selectively allow a current to flow there through;
a second switch disposed between said first electrical connector and said second electrical connector, said second switch configured to selectively allow a current to flow there through;
a first sensor adapted to sense a current in said first electrical connector;
a second sensor adapted to sense a current in said second electrical connector; and
a microprocessor connected to said first sensor and said second sensor, said microprocessor adapted to cause said first switch to open in response to a current being sensed by both first sensor and said second sensor, and to be closed in response to a current being sensed by only a single one of said first sensor and said second sensor.

2. The assembly of claim 1, wherein the electrical connectors comprise inductive coils.

3. The assembly of claim 1, wherein the electrical connectors comprise conductive rings.

4. The assembly of claim 1, wherein rectifiers are disposed between the electrical connectors and a power consuming circuit of the electrical tool instrument.

5. The assembly of claim 4, wherein the rectifiers are full-wave solid state rectifiers.

6. The assembly of claim 4, wherein one or more electrical filtering devices are disposed between the rectifiers and the power consuming circuit of the downhole tool.

7. The assembly of claim 1, wherein the switches are solid state.

8. The assembly of claim 7, wherein the switches comprise triodes for alternating current (TRIACs).

9. The assembly of claim 1, wherein the switches are electromechanical.

10. The assembly of claim 9, wherein the switches comprise relays.

11. The assembly of claim 1, wherein the downhole tool comprises resistivity transmitter and receiver coils.

12. The assembly of claim 1, wherein the downhole tool comprises a seismic device.

13. A method for downhole power distribution, comprising:
providing a downhole tool between a first adjacent downhole assembly and a second adjacent downhole assembly, the downhole tool having a first electrical coupling, a second electrical coupling, said first electrical coupling selectively electrically coupled to said second electrical coupling through at least one switch between said first electrical coupling and said second electrical coupling, a first sensor adapted to detect power in said first electrical coupling, and a second sensor adapted to detect power in said second electrical coupling;
electrically coupling the downhole tool to the first adjacent downhole assembly and the second adjacent downhole assembly through said first electric coupling and said second electric coupling;
supplying power to the downhole tool from only the first adjacent downhole assembly through said first electrical coupling;
detecting from the first adjacent downhole assembly at said first electrical coupling and not detecting any power from the second adjacent downhole assembly at said second electrical coupling; and
electrically coupling the first electrical coupling and the second electrical coupling in response to detecting the supply of power from the first electrical coupling and not the second electrical coupling.

14. The method of claim 13, further comprising, detecting power at both the first adjacent downhole assembly and the second downhole assembly and decoupling the electrical coupling of the first downhole assembly and the second downhole assembly in response to detecting power at both the first adjacent downhole assembly and the second downhole assembly.

15. The method of claim 13, wherein the coupling of the first adjacent assembly and the second adjacent assembly is initiated by either a direct current source or an alternating current source.

16. A downhole tool assembly, comprising;
a first electrical power source;
a second electrical power source;
an electrical tool instrument electrically coupled to the first electrical power source and the second electrical power source;
at least one switch between the first electrical power source and the second electrical power source, the at least one switch adapted to selectively electrically couple when the switch is closed and decouple the first electrical power source and the second electrical power source when the switch is open;
a first sensor adapted to detect a current at said first electrical power source;
a second sensor adapted to detect a current at said second electrical power source; and
a microprocessor in electrical communication with the at least one switch, the first sensor, and the second sensor, the microprocessor adapted to cause the switch to open when the first sensor detects a current and the second sensor detects a current, and close when only the first or only the second sensor detects a current.

* * * * *